United States Patent Office 3,531,374
Patented Sept. 29, 1970

3,531,374
DIAGNOSTIC TEST FOR GAUCHER'S DISEASE
AND NIEMANN-PICK DISEASE
Roscoe O. Brady, Jr., Arlington, Va., and John P. Kampine, Wood, Wis., assignors to the United States of America as represented by the Secretary of the Department of Health, Education, and Welfare
No Drawing. Filed Dec. 27, 1967, Ser. No. 693,771
Int. Cl. C12k 1/04
U.S. Cl. 195—103.5                                    9 Claims

ABSTRACT OF THE DISCLOSURE

A method for diagnostic testing for Gaucher's and Niemann-Pick diseases. The test are based on the discovery that enzymes for the cleavage of specific sphingolipids are normally present in the leukocytes. The activity of the glucocerebroside-cleaving enzyme and of the sphingomyelin-cleaving enzyme was found to decrease in the presence of Gaucher's and of Niemann-Pick diseases respectively. The decrease in enzyme activity is proportional to the severity of the disease. By utilizing $^{14}C$ labeled glucocerebroside and sphingomyelin respectively, and determining the amount of cleavage by use of liquid scintillation spectrometry, the presence, rate of progression, and severity can be determined.

---

This invention relates to diagnostic tests for sphingolipidoses, and particlarly to diagnostic tests for Gaucher's disease and Niemann-Pick disease.

It is well known that abnormal quanttiies of glucocerebroside accumulate in the reticuloendothelial cells of the spleen, liver and bone marrow of patients with Gaucher's disease. Recent studies, which utilized slices of spleen tissues from normal human subjects and from patients with Gaucher's disease, indicated no abnormality in cerebroside formation. This observation lead to the hypothesis that a deficiency in one or more enzymes involved in the catabolism of glucocerebrosides was responsible for the metabolic defect. Investigations were then made into the catabolism of glucocerebrocide, and to this end glucocerebroside labeled in carbon 1 of the D-glucose portion of the molecule was prepared. Cell-free preparations of both rat and human spleen tissue were used to catabolize the glucose-1-$^{14}C$ and the resulting $^{14}CO_2$ was measured for radioactivity.

Further, it was later demonstrated that an enzyme present in human spleen tissue catalyzes the hydrolysis of the glycosidic bond of the cerebrocide molecule. Eventually the produce of this reaction were shown to be glucose and ceramide (N-acylsphingosine). Additional studies were then performed in order to determine the level of the glucocerebroside-cleaving enzyme in human spleen tissue obtained from patients with various conditions. The results of these studies clearly showed the enzymatic activity in the spleens of patients with Gaucher's disease was considerably reduced.

In another aspect of this invention, it has long been known that excessive quantities of sphingomyelin accumulate in certain tissues of patients with Niemann-Pick disease. The rate of biosynthesis of sphingomyelin in tissues from these patients appeared to be essentially normal. It was then hypothesized that the metabolic lesion in Niemann-Pick disease might, as in Gaucher's disease, be of a catabolic nature. Experimental evidence showed the presence of a specific enzyme which catalyzes the hydrolysis of sphingomyelin in both rat and human liver tissue. In further studies, sphingomyelin labeled in the methyl carbon atoms of the choline portion of the molecule was prepared. The purified enzyme cleaved $^{14}C$ - sphingomyelin to $^{14}C$ - phosphorylcholine and ceramide.

Similar enzymatic activity could be detected in human liver tissue. It was later found that the level of the sphingomyelin-cleaving enzyme in the liver and kidney in patients with Niemann-Pick disease is markedly less than the level of the enzyme in the normal patient or in patients with other conditions.

It has been found that specific enzymes which catalyze the hydrolysis of glucocerebroside and of sphingomyelin are present in preparations of washed human white blood cells. Further, the level of activity of these respective enzymes is markedly decreased in leukocyte preparations obtained from patients with Gaucher's and with Niemann-Pick diseases respectively. It has now been determined that an assay of these enzymes in human white blood cells is useful in the differential diagnosis of Gaucher's and Niemann-Pick diseases.

Diagnostic tests presently in use for Gaucher's and Niemann-Pick diseases suffer from several serious drawbacks. These prior art tests involve the use of tissue specimens obtained from specific organs such as the liver and spleen, or of bone marrow smears. Obviously, the difficulties in obtaining such specimens are considerable and the danger cannot be underestimated. In many instances, removal of the organ is necessary before an assay can be made. Time consuming and expensive preparation is then necessary before the assay is performed. The assay is then made using chemical analysis. While analysis of organ tissue may be specific, bone marrow smears are not.

It is, therefore, an object of this invention to provide a simple, specific, and relatively quick diagnostic test for the sphingolipidoses.

It is another object of this invention to provide a method of diagnosing Gaucher's disease and Niemann-Pick disease free of the aforementioned and other such disadvantages.

It is a further object of this invention to provide a method for the differential diagnosis of Gaucher's disease and Niemann-Pick disease.

It is yet another object of this invention to provide a method for the diagnosis of Gaucher's and Niemann-Pick diseases by determining the activity of the respective sphingolipid hydrolases in human leukocytes.

These and other objects of this invention will in part be obvious and in part be pointed out as the description of the invention proceeds.

According to a preferred embodiment of this invention differential diagnosis of sphingolipidoses, and more particularly of Gaucher's and Niemann-Pick diseases, is performed by preparing an incubation mixture of leukocytes with labeled glucocerebroside and sphingomyelin respectively. More particularly, the respective sphingolipid hydrolases which have been found to be present in the leukocytes, and whose activity has been found to be dependent on the presence of the respective diseases, catalyze the cleavage of the respective lipid compounds, which cleavage can then be determined by conventional methods such as liquid scintillation spectrometry. The activity of these enzymes is not only dependent upon the presence or absence of the respective disease, but is proportional to the degree of onset of the disease.

Generally, in the preferred embodiment, leukocytes are separated from erythrocytes by different sedimentation. A preparation of washed leukocytes is incubated with the respective labeled lipid compound and the amount of the labeled cleavage product is determined by liquid scintillation spectrometry. The amount of glucocerebroside cleaved is proportional to the amount of protein in the washed leukocyte suspensions, from 0–960 μg. of protein, and to the number of leukocytes in the incubation mixture from 0 to $8 \times 10^6$ white cells. Due to certain variations in the leukocyte count in some specimens it has been found that the preferred reference is the amount of protein in the washed leukocyte suspension. The amount of sphingomyelin cleaved is also proportional to the amount of protein in the washed leukocyte suspensions, from 0 to 400 μg. of protein. The enzyme activity in the leukocyte suspensions is represented by units of enzymatic activity per mg. of protein. One unit of enzymatic activity is defined as the amount of enzyme required to catalyze the hydrolysis of 1 mμmole of the respective lipid compound per hour under standardized incubation conditions. The amount of protein is determined by conventional methods such as that described by Itzhak et al. in Anal. Biochem., 9, pp. 401–410 (1964) which is to be considered embodied by reference herein.

In the following examples leukocytes were used which were separated from erythrocytes by differential sedimentation. The differential sedimentation was performed as follows:

(1) Ten ml. of venous blood were added to a test tube containing 2 ml. of a solution composed of:

(a) 5 g. of dextran,
(b) 0.7 g. of sodium chloride, and
(c) 50 mg. of heparin per 100 ml.

(2) The contents were mixed and the red blood cells were allowed to settle. This required approximately 45 minutes at room temperature.

(3) The plasma containing the suspended leukocytes was removed with a capillary pipette, and the suspension was centrifuged for 10 minutes at 600 g.

(4) The supernatant was discarded and the leukocyte pellet was suspended and washed twice with isotonic saline solution (0.85 percent sodium chloride solution).

EXAMPLE 1

Gaucher's disease was diagnosed by determining the activity of the glucocerebroside-cleaving enzyme of leukocytes on glucose-1-$^{14}$C-cerebroside.

The white blood cells, separated by differential sedimentation from 10 ml. of venous blood, were suspended in a fresh portion of isotonic saline solution, and the cells were counted with a Coulter counter. The suspensions were adjusted with saline so that they contained from 20,000 to 60,000 leukocytes per μl.

An incubation mixture was prepared containing the following ingredients:

(1) 50–100 μl. portions of the leukocyte suspension,
(2) 15 μmoles of potassium phosphate buffer (pH 6.0),
(3) 300 μg. of sodium cholate,
(4) 200 μg. of Cutscum (isooctylphenoxypolyoxyethanol, Fisher Chemical Co.), and
(5) 125 mμmoles of glucose-1-$^{14}$C-cerebroside (440,000 count min.$^{-1}$μmole$^{-1}$), prepared according to Brady et al., J. Biol. Chem., 240, p. 39 (1965) which is embodied herein by reference, in a final volume of 0.15 ml.

The mixture was incubated for 1 hour at 37° C. in air. The amount of glucose-1-$^{14}$C cleaved was determined by liquid scintillation spectrometry as described by Brady et al. in Biochem. Biophys, Research Commun., 18, p. 221 (1965) which is embodied herein by reference. The results are shown in Table 1.

TABLE 1

Glucocerebroside-cleaving enzyme in human white blood cells. One unit of enzymatic activity is defined as the amount of enzyme required to catalyze the hydrolysis of 1 mμmole of glucocerebroside per hour.

| | Age, yr. | Sex | Units of enzymatic activity per mg. of protein |
|---|---|---|---|
| Normal Individuals | 40 | F | 3.4 |
| | 20 | F | 3.7 |
| | 32 | M | 2.7 |
| | 48 | M | 4.1 |
| | 39 | M | 3.8 |
| | 37 | M | 4.2 |
| | 31 | M | 3.4 |
| | 17 | M | 3.4 |
| | 21 | M | 6.2 |
| | 31 | F | 4.6 |
| | 48 | F | 3.1 |
| | 32 | F | 3.8 |
| | 30 | M | 4.0 |
| | 12 | F | 5.6 |
| | 23 | F | 3.7 |
| | 45 | M | 4.4 |
| | 3 | M | 5.0 |
| | 28 | M | 3.9 |
| | 9 | F | 5.2 |
| Familial hyperlipoproteinemia Type II | 17 | M | 3.8 |
| | 32 | M | 2.8 |
| Tangier Disease | 12 | F | 3.3 |
| Refsum's syndrome | 27 | F | 3.0 |
| | 28 | M | 3.0 |
| Niemann-Pick disease | 18 | M | 3.4 |
| | 3 | M | 4.4 |
| | 3 | M | 6.0 |
| | 4 | M | 5.5 |
| Lipidosis of unknown etiology | 8 | F | 3.4 |
| | 8 | M | 3.1 |
| | 13 | F | 4.9 |
| | Mean±S.E. | | 4.0±0.17 |
| Gaucher's disease | 40 | F | .47 |
| | 48 | M | .77 |
| | 47 | F | .78 |
| | 10 | M | .46 |
| | 14 | M | .57 |
| | 17 | M | 0.53 |
| | Mean±S.E. | | 0.60±0.05 |
| | | | P <.001 |

As can be seen, there is a marked attenuation of glucocerebroside-cleaving enzyme activity in the leukocyte suspensions obtained from patients with Gaucher's disease. This enzymatic defect is quite specific for patients with Gaucher's disease since the level of activity appears to be within the normal range in leukocyte preparations from patients with Niemann-Pick disease. A range of from 0 to about 1 unit of enzymatic activity per mg. of protein can be considered a positive diagnostic indication of the presence of Gaucher's disease. Since attenuation of enzyme activity is dependent on the presence of Gaucher's disease, and the degree of attenuation is dependent on the degree of disease, it should be understood that an enzymatic activity of from about 1 to about 2 is to be considered indicative of the need for further diagnostic testing and not as a negative reading. This latter range may indicate a positive reading in a patient of advanced age or may indicate a slow rate of progress of the disease.

EXAMPLE 2

In order to diagnose Niemann-Pick disease, the activity of sphingomyelin-cleaving enzyme was determined on spingomyelin-$^{14}$C.

The washed white blood cells obtained by differential sedimentation from 5 ml. of venous blood were suspended in 0.3 ml. of a solution of sodium cholate (5 mg./ml.). The suspended cells were chilled in a bath at −10° C. and subjected to sonic oscillation for 15 seconds. The suspensions were allowed to stand for 1 hour at 0° C. and then centrifuged at 37,000 g. for 20 minutes. Over 92 percent of the sphingomyelin-cleaving enzyme was recovered in the clear supernatant.

An incubation mixture was prepared containing the following:

(1) 10–50 μl. portions of the leukocyte enzyme preparation, (2) 25 μmoles of potassium acetate buffer (pH 5.0), (3) 70 mμmoles of sphingomyelin-$^{14}$C (327,000 count min.$^{-1}$ μmole$^{-1}$), prepared according to Kanfer et al., J. Biol. Chem., 241, p. 1081 (1966) which is embodied hereby by reference.

(4) 50 μg. of sodium cholate, and (5) water in a final volume of 0.18 ml.

The mixtures were incubated for 1 hour at 37° C. in air, and the amount of $^{14}$C-phosphorylcholine cleaved was determined by the method of Brady et al. in Proc. Natl. Acad. Sci., 55, pp. 366–369 (1966), which is embodied herein by reference. The results are shown in Table 2.

TABLE 2

Sphingomyelin-cleaving enzyme in human white blood cell preparations. The procedures for the preparation of the enzyme and conditions of incubation are described in the text. One unit of enzymatic activity is defined as the amount of enzyme required to catalyze the hydrolysis of 1 mμmole of sphingomyelin per hour.

|  | Age, yr. | Sex | Units of enzymatic activity per mg. of protein |
|---|---|---|---|
| Normal | 20 | M | 5.2 |
|  | 1½ | M | 4.1 |
|  | 32 | M | 4.6 |
|  | 42 | F | 4.5 |
|  | 7 | F | 3.2 |
|  | 28 | F | 5.6 |
|  | 22 | F | 3.3 |
|  | 32 | F | 4.5 |
|  | 30 | M | 4.4 |
|  | 23 | F | 3.3 |
|  | 48 | M | 5.0 |
|  | 28 | M | 3.6 |
| Paroxysmal nocturnal hemoglobinuria | 18 | M | 4.5 |
| Hypernephroma | 47 | M | 4.7 |
| Lymphosarcoma | 28 | M | 6.0 |
| Fabry's disease | 23 | M | 4.8 |
| Gaucher's disease | 10 | M | 3.4 |
|  | 30 | F | 4.3 |
|  | 17 | M | 4.0 |
| Lipiosis of unknown etiology | 8 | M | 3.3 |
|  | 1 | M | 5.0 |
|  | 13 | F | 4.1 |
|  | Mean±S.E. |  | 4.3±0.16 |
| Niemann-Pick disease | 3 | M | 0.25 |
|  | 26 | F | 0.84 |
|  | 8 | M | 0.00 |
|  | 3 | M | 0.53 |
|  | 4 | M | 0.61 |
|  | 1 | M | 0.10 |
|  | Mean±S.E. |  | 0.39±0.12 |

Although the presence of sphingomyelin-cleaving enzyme activity could be detected in intact leukocytes, some difficulty was encountered in trying to obtain a relation between the amount of activity and the amount of protein in the leukocyte suspensions. This limitation was overcome by disrupting the cells with sonic oscillation of washed leukocytes while they were suspended in a dilute solution of sodium cholate. Under these conditions, the amount of sphingomyelin hydrolyzed was proportional to the amount of protein in the supernatant after centrifugation at 37,000 g., over a range from 0 to 400 μg. of protein. There was a profound diminution of activity of the sphingomyelin-cleaving enzyme in preparations from patients with Niemann-Pick disease compared with those obtained from normal human beings and patients with various other disorders. The specificity of this assay is indicated by the fact that enzyme activity in the leukocyte preparations obtained from patients with other sphingolipodystrophic conditions, such as Gaucher's disease and Fabry's disease, was normal. As with the diagnostic test for Gaucher' disease, the similar test for Niemann-Pick disease can be considered positive if a reading of from 0 to about 1 unit of enzymatic activity per mg. of protein is obtained. Further, a reading of between about 1 and about 2 units of enzymatic activity per mg. of protein should be considered, as with the diagnostic test for Gaucher's disease, an indication that further diagnostic testing is to be performed and should not be taken as a negative result.

It has become clear that the herein disclosed tests for Gaucher's and Niemann-Pick diseases are specific and accurate enough to be used for purposes of prognosis. Both the severity and the rate of progression of the respective disease can be determined by this diagnostic test.

Thus, it is apparent that the aforementioned objects of this invention have been fulfilled and that a useful method in the differential diagnosis of the sphingolipidoses such as Gaucher's disease and Niemann-Pick disease has been set forth. While this invention has been described by reference to a preferred embodiment it is to be understood that many modifications may be made without departing from the spirit or the scope thereof.

Accordingly, what is claimed is:

1. A method for diagnosing Gaucher's disease by determining the activity of sphingolipid hydrolases in human leukocytes, comprising the steps of:
   (a) separating said leukocytes from erythrocytes by differential sedimentation;
   (b) adding glucose-1-$^{14}$C-cerebroside to a suspension of said leukocytes in isotonic saline solution to form an incubation mixture;
   (c) incubating said mixture, whereby glucocerebroside-cleaving enzyme catalyzes the cleavage of said glucose-1-$^{14}$C-cerebroside to form, inter alia, glucose-1-$^{14}$C and
   (d) determining the amount of glucose-1-$^{14}$C cleaved by means of liquid scintillation spectrometry, whereby an indicated enzymatic activity of from 0 to about 1 unit per mg. of protein in the leukocytes indicates the presence of Gaucher's disease, where one unit of enzymatic activity is the amount of enzyme required to catalyze the hydrolysis of 1 mμmole of glucocerebroside per hour.

2. A method as defined in claim 1 further comprising the step of including potassium phosphate buffer to a pH of about 6.0 sodium cholate and isooctylphenoxy polyoxyethanol in said incubation mixture.

3. A method as defined in claim 1 wherein said differential sedimentation comprises the steps of:
   (a) mixing about 10 ml. of venous blood with about 2 ml. of a solution containing
       5 g. dextran,
       0.7 g. sodium sodium chloride, and
       50 mg. heparin/100 ml;
   (b) allowing said erythrocytes to settle at room temperature;
   (c) removing the resulting plasma phase, said plasma phase containing said leukocytes;
   (d) centrifuging said plasma for about 10 min. at about 600 g. whereby a leukocyte pellet and a supernatant are formed; and
   (e) washing said leukocyte pellet with isotonic saline solution.

4. A method as defined in claim 3 wherein said incubation mixture contains from about 50 to about 100 μl. of said leukocyte suspension, about 15 μmoles potassium phosphate buffer, about 30 μg. of sodium cholate, about 200 μg. of isooctylphenoxy polyoxyethanol and about 125 mμmoles of glucose-1-$^{14}$C-cerebroside at 440,000 count min.$^{-1}$μmole$^{-1}$ in a final volume of 0.15 ml.; and incubation is continued for about 1 hour, at about 37° C., in air.

5. A method for diagnosing Niemann-Pick disease by determining the activity of sphingolipid hydrolases in human leukocytes comprising the steps of:
   (a) separating said leukocytes from erythrocytes by differential sedimentation;
   (b) subjecting said leukocytes to sonic oscillation;
   (c) adding sphingomyelin-$^{14}$ to a leukocyte enzyme preparation to form an incubation mixture;
   (d) incubating said mixture, whereby sphingomyelin-cleaving enzyme catalyzes the cleavage of said sphingomyelin-$^{14}$C to form, inter alia $^{14}$C-phosphorylcholine; and
(e) determining the amount of $^{14}$C-phosphorylcholine by means of liquid scintillation spectrometry, whereby an indicated enzymatic activity of from 0 to about 1 unit per mg. of protein in the leukocytes indicates the presence of Niemann-Pick disease, where one unit of enzymatic activity is the amount of enzyme required to catalyze the hydrolysis of 1 m$\mu$mole of sphingomyelin per hour.

6. A method as defined in claim 5 further comprising the step of including potassium acetate buffer to a pH of about 5.0, and sodium cholate in said incubation mixture.

7. A method as defined in claim 5 wherein said differential sedimentation comprises the steps of:
(a) mixing about 10 ml. of venous blood with about 2 ml. of a solution containing
   5 g. dextran,
   0.7 g. sodium chloride, and
   50 mg. heparin/100 ml.;
(b) allowing said erythrocytes to settle at room temperature;
(c) removing the resulting plasma phase, said plasma phase containing said leukocytes;
(d) centrifuging said plasma for about 10 min. at about 600 g., whereby a leukocyte pellet and a supernatant are formed; and
(e) washing said leukocyte pellet with isotonic saline solution.

8. A method as defined in claim 7 wherein said incubation mixture contains from about 10 to about 50 $\mu$l. of said leukocyte enzyme preparation, about 25 $\mu$moles of potassium acetate buffer, about 70 m$\mu$moles of sphingomyelin-$^{14}$C at 327,000 count min.$^{-1}$$\mu$mole$^{-1}$, about 50 $\mu$g. of sodium cholate, and water in a final volume of 0.18 ml.; and incubation is contained for about 1 hour, at about 37° C., in air.

9. A method as defined in claim 7, further comprising the steps of:
(a) suspending the leukocytes obtained from 5 ml. of venous blood in 0.3 ml. of a solution of 5 mg. of sodium cholate per ml.;
(b) chilling said suspension to about −10° C.;
(c) subjecting said suspension to sonic oscillation for about 15 sec.;
(d) allowing said suspension to stand for about 1 hour at about 0° C.;
(e) centrifuging said suspension at about 37,000 g. for about 20 min.; and
(f) recovering the resulting supernatant solution as said leukocyte enzyme preparation.

References Cited

Clinical Hematology, Wintrobe, M. M., 1949, p. 226.
Blood—The Journal of Hematology, vol. 22, No. 6, 1963, pp. 690–691.
Biochem. Biophys. Res. Comm. vol. 18, No. 2, 1965.
Brady et al., Metabolism of Glucocerebrosides, pp. 221–225, National Acad. of Science—Proceedings, vol. 55, 1966.
Brady et al., The Metabolism of Sphingomyelin, pp. 366–369.

A. LOUIS MONACELL, Primary Examiner

G. M. NATH, Assistant Examiner

U.S. Cl. X.R.

424—2